(12) United States Patent
Geissler et al.

(10) Patent No.: US 8,286,760 B2
(45) Date of Patent: Oct. 16, 2012

(54) DISC BRAKE FOR A COMMERCIAL VEHICLE

(75) Inventors: Steffen Geissler, Hainburg (DE); Johann Baumgartner, Moosburg (DE); Robert Trimpe, Wessling (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/851,400

(22) Filed: Aug. 5, 2010

(65) Prior Publication Data

US 2011/0024241 A1 Feb. 3, 2011

Related U.S. Application Data

(63) Continuation of application No. PCT/EP2009/000804, filed on Feb. 5, 2009.

(30) Foreign Application Priority Data

Feb. 7, 2008 (DE) .......................... 10 2008 008 308

(51) Int. Cl.
*F16D 65/00* (2006.01)
*F16D 55/00* (2006.01)
(52) U.S. Cl. ..................................... 188/73.1; 188/72.1
(58) Field of Classification Search .................. 188/71.1, 188/71.9, 72.1, 72.8, 73.1
See application file for complete search history.

(56) References Cited

U.S. PATENT DOCUMENTS

| 3,568,379 | A | * | 3/1971 | Johnsson et al. .................... 52/21 |
| 3,584,708 | A | * | 6/1971 | Heck ............................. 188/71.6 |
| 5,090,520 | A | | 2/1992 | Gockel et al. |
| 5,927,445 | A | | 7/1999 | Bieker et al. |
| 6,896,098 | B2 | * | 5/2005 | Vom Stein et al. ............. 181/204 |
| 7,815,021 | B2 | * | 10/2010 | Baumgartner et al. ....... 188/72.9 |
| 2001/0003321 | A1 | * | 6/2001 | Sano ........................ 188/218 XL |
| 2004/0026188 | A1 | * | 2/2004 | Emmett et al. ................ 188/73.1 |
| 2006/0118365 | A1 | | 6/2006 | Fischer et al. |
| 2007/0209887 | A1 | * | 9/2007 | Macke .......................... 188/71.8 |

FOREIGN PATENT DOCUMENTS

| DE | 195 15 063 C1 | 2/1997 |
| EP | 0 402 835 A1 | 12/1990 |
| WO | WO 2004/102023 A1 | 11/2004 |

OTHER PUBLICATIONS

International Search Report dated May 7, 2009 including English-language translation (Four (4) pages).

* cited by examiner

*Primary Examiner* — Melody Burch
(74) *Attorney, Agent, or Firm* — Crowell & Moring LLP

(57) ABSTRACT

A disc brake, especially for a commercial vehicle, includes a caliper extending across a brake disc and a brake application device which can be used to force a brake pad against the brake disc by at least one actuating spindle that is guided in the caliper, in correspondence with an associated thrust piece. The disc brake is designed such that the thrust piece consists at least partially of a duroplastic material. A cap is interposed between faces of the actuating spindle and the thrust piece, oriented toward one another and forming contact surfaces. The walls of the cap enclose a projection of the thrust piece.

25 Claims, 5 Drawing Sheets

DISC BRAKE FOR A COMMERCIAL VEHICLE

CROSS-REFERENCE TO RELATED APPLICATIONS

This application is a continuation of PCT International Application No. PCT/EP2009/000804, filed Feb. 5, 2009, which claims priority under 35 U.S.C. §119 from German Patent Application No. DE 10 2008 008 308.9, filed Feb. 7, 2008, the entire disclosures of which are herein expressly incorporated by reference.

BACKGROUND AND SUMMARY OF THE INVENTION

The invention relates to a disc brake and, in particular, to a disc brake for a commercial vehicle having a caliper extending across a brake disc and a brake application device with which a brake pad can be pressed against the brake disc via at least one actuating spindle, guided in the caliper, and an associated thrust piece.

The basic structure of such a disc brake is known, for example, from DE 195 15 063 C2 (see FIG. 7). In this case, the brake application device 20 includes two actuating spindles 21 which are mounted displaceably in the caliper 22 and which each carry at their end oriented towards the brake disc a thrust piece 24 with which, upon operation, the brake pad 26 is pressed against the brake disc 28.

The thrust pieces are configured such that they distribute the force to be transmitted, which is exerted by the brake application device, from a force application area of small dimensions formed by the end faces, oriented towards one another and therefore forming pressure surfaces, of the actuation spindle and of the respective thrust piece, over a relatively large area at the abutment site of the thrust piece against the brake pad.

The objective of this configuration is to minimize the bending stress, and therefore deformation, of the brake pad, primarily of a pad carrier plate, in order to achieve a force distribution as uniform as possible over a friction lining which is connected to the pad carrier plate and is in contact with the brake disc during braking.

Upon actuation of the brake, the frictional heat produced is transmitted by the large-area contact of the thrust pieces with the pad carrier plate into the interior of the caliper which houses the brake application device, thus exposing the components arranged therein to very high thermal stress.

Bellows are connected to the thrust pieces, which bellows are arranged in the region of the thrust pieces and with which the interior of the caliper is sealed in the exit region of the actuating spindle. These bellows are, in particular, highly stressed. There is a particular risk of damage to the components made from plastics and/or elastomers, and to the lubrication grease which is also provided in the caliper.

Especially under extreme loading of the brake, a temperature of 500° C. can be produced on the brake pad, and consequently a temperature of 300° C. and more at the contact points of the bellows with the thrust pieces.

In order to reduce the transmission of heat, it has already been proposed to insert insulation plates. However, such plates have not proved suitable for prolonged operation as they execute relative movements against the thrust pieces upon actuation of the brake with a high application force, thus leading to unacceptable wear.

In addition, the fastening of these insulating plates to the thrust pieces requires additional components and correspondingly complex assembly, with the resulting additional cost.

To this extent the known disc brake represents a rather unsatisfactory solution with regard both to service life and to manufacturing cost.

It is the object of the invention to develop a disc brake of the above-mentioned type such that service life is increased and operating safety improved while achieving low complexity and cost with regard to construction and manufacture.

This object is achieved by a disc brake having a caliper extending across a brake disc and a brake application device with which a brake pad can be pressed against the brake disc via at least one actuating spindle, guided in the caliper, and an associated thrust piece. The thrust piece consists at least partially of a duroplastic material, and a cap is interposed between the end faces, oriented towards one another and forming pressure surfaces, of the actuating spindle and of the thrust piece. The wall of the cap surrounds a projection of the thrust piece.

A disc brake configured according to the invention achieves a great many advantages. Mention should first be made of an increased service life resulting, above all, from the fact that the thrust pieces configured according to the invention have substantially lower thermal conductivity than those used hitherto, thereby minimizing the thermal stress on the other components, in particular those which are to be regarded as temperature-sensitive and are located in the interior of the caliper, i.e. in the brake caliper housing.

In addition, the novel disc brake can be produced very cost-effectively, a duroplastic material reinforced with filling materials being preferably used, as already employed, for example, for brake pistons in hydraulically actuated brakes.

As a result of a high proportion of filling material, in the form of fibers, preferably glass fibers according to an advantageous embodiment of the invention, a very low thermal conductivity of the thrust piece is achieved.

In this case the composite material has acceptable compressive strength, while disadvantageous material properties, such as very low bending and tensile strength and low elongation at rupture because of the high proportion of glass fiber, are kept within innocuous limits in operation by the cap provided according to the invention. That is to say that, surprisingly, as a result of the invention the strength and durability of the thrust pieces has been successfully raised to a required level despite the load capacity of the material which, in itself, is insufficient for the intended purpose. In this context, the simple and therefore cost-effective implementation of these measures is to be regarded as especially noteworthy.

By virtue of the cap, preferably formed by a steel preform the wall of which surrounds a projection of the thrust piece, which cap is interposed between the end faces of the actuating spindle and the thrust piece facing towards one another and forming pressure surfaces, the hitherto insufficient bursting strength of this cylindrical projection is made secure.

A preferred development of the invention provides that the cap, which, moreover, may consist of a different, comparably high-strength material instead of steel, is configured with a circumferential collar which extends radially outwards and bears against a shoulder of the thrust piece which delimits a pressure plate formed. An enlarged pressure surface is thereby achieved, since the pressure force transmitted by the actuating spindle is distributed over a larger area, so that the overall surface pressure, especially that acting on the projection, is reduced to a significant degree.

The cap, as a preform, may be fitted, pressed or bonded, or may be in the form of an insert which is press-fitted or injection-molded in.

The thrust piece is advantageously configured such that the very brittle duroplastic material is prevented from splitting off in the region of corners and edge zones. For this purpose, these regions are provided with curvatures as large as possible.

In order to relieve the pressure plate from bending stresses arising under high loadings, differences of deformation occurring as a result of high compressibility can be compensated by suitable shaping of the base of the thrust piece, which may also be referred to as the disc base and which bears against the pad carrier plate under braking.

In this case the disc base is configured in such a manner that, should it be applied to the pad carrier plate with very low force, only the middle region of the disc base, that is the pressure surface, comes into contact with the pad carrier plate while a widening gap is produced towards the edge.

As the pressure force increases the middle region of the thrust piece is compressed significantly more strongly than the edge zone of the disc base, so that, with increasing loading, the disc base comes into correspondingly greater contact with the lining carrier plate and, with maximum forces acting, almost complete contact is reached.

It is therefore ideally achieved that the large contact surface of the thrust piece comes into use, appropriately, only in the event of relatively heavy braking, which in principle occurs only infrequently.

The bending stress on the outer edge region is therefore considerably reduced in frequency, which naturally has the effect of lengthening the service life of the thrust piece as a whole.

The smaller central contact surface of the thrust piece, which is effective under relatively light braking and which rests against the pad carrier plate, leads to a minimizing of heat transfer, which also contributes to reducing thermal stress.

A duroplastic material consisting of phenol resin to which short glass fibers are admixed as filling material is preferably used. In this case the density is 2.1 g/cm$^3$, the compressive strength 350 MPa, the bending strength 175 MPa, the tensile strength 75 MPa, the bending modulus of elasticity 24 GPa and the tensile modulus of elasticity 29 GPa. As compared to the steel used hitherto for the thrust piece, for example 16 MnCr5 with a thermal conductivity of approximately 50 W/m K, the thermal conductivity of the new thrust piece is <1 W/m K.

A comparison of these values alone shows very impressively the magnitude of the improvement made by the invention with respect to a reduction in thermal stress.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
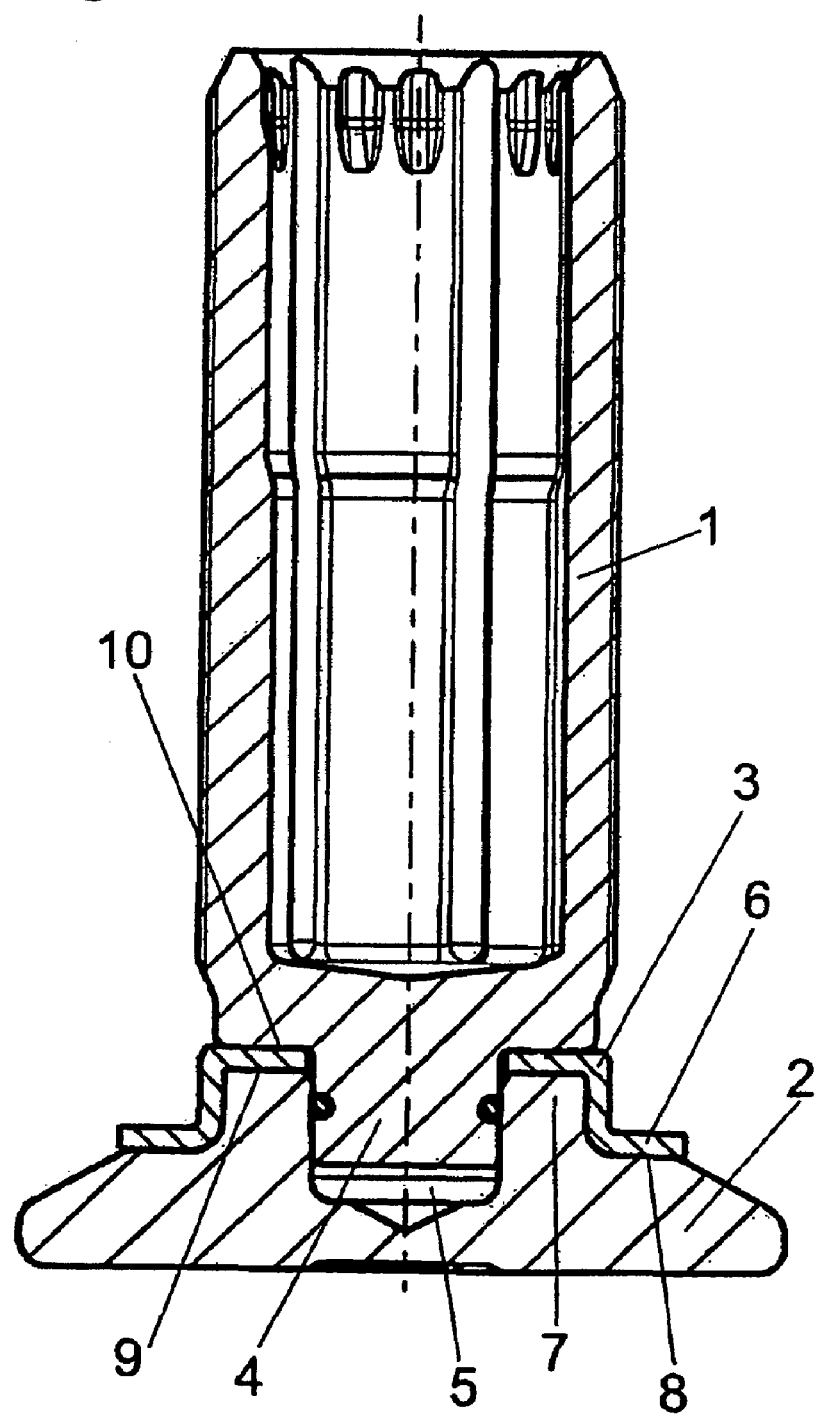
FIGS. 1 to 3 show respective exemplary embodiments of a detail of a disc brake according to the invention in a sectional side view.
Figure 2:
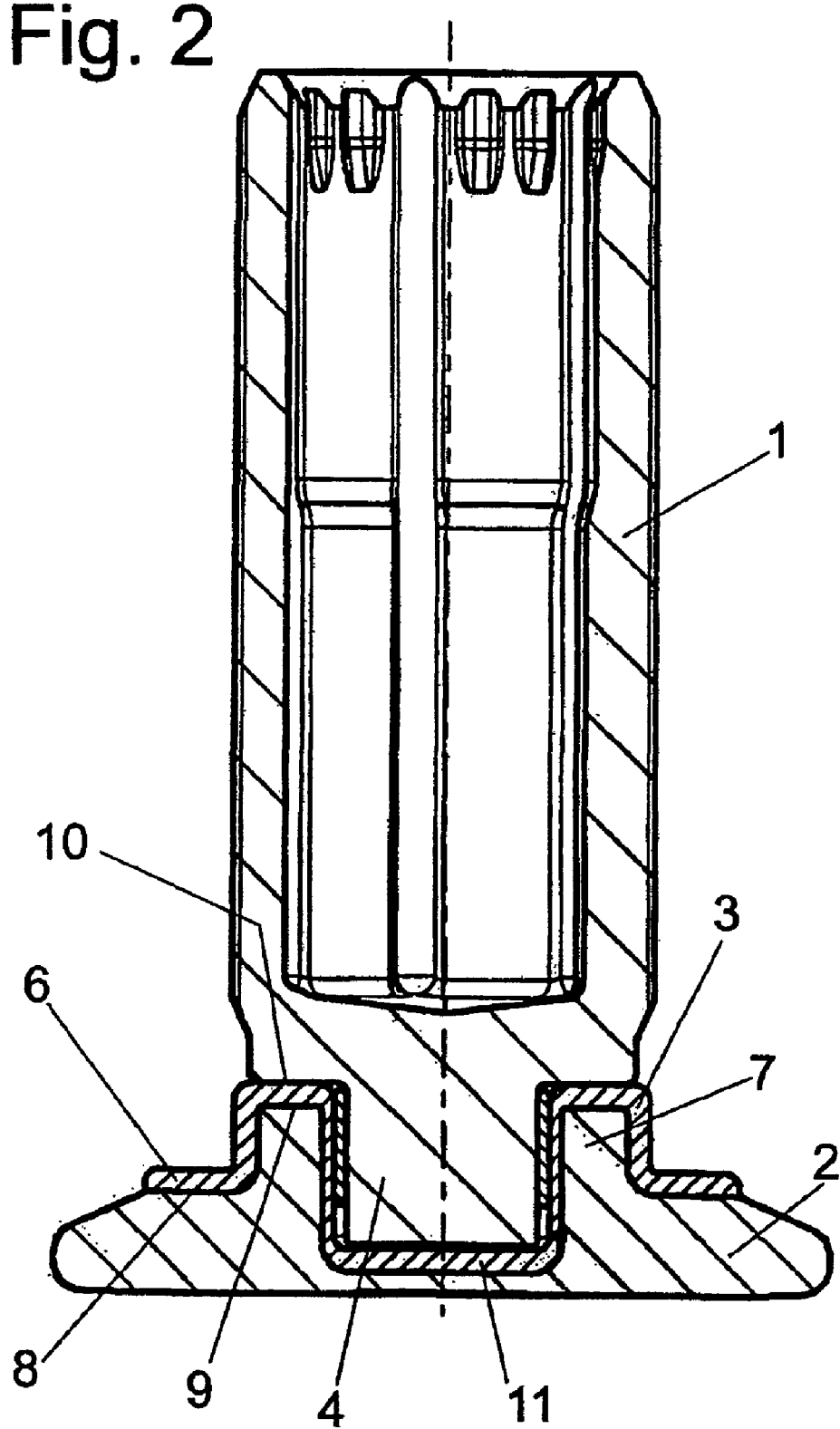
Figure 3:
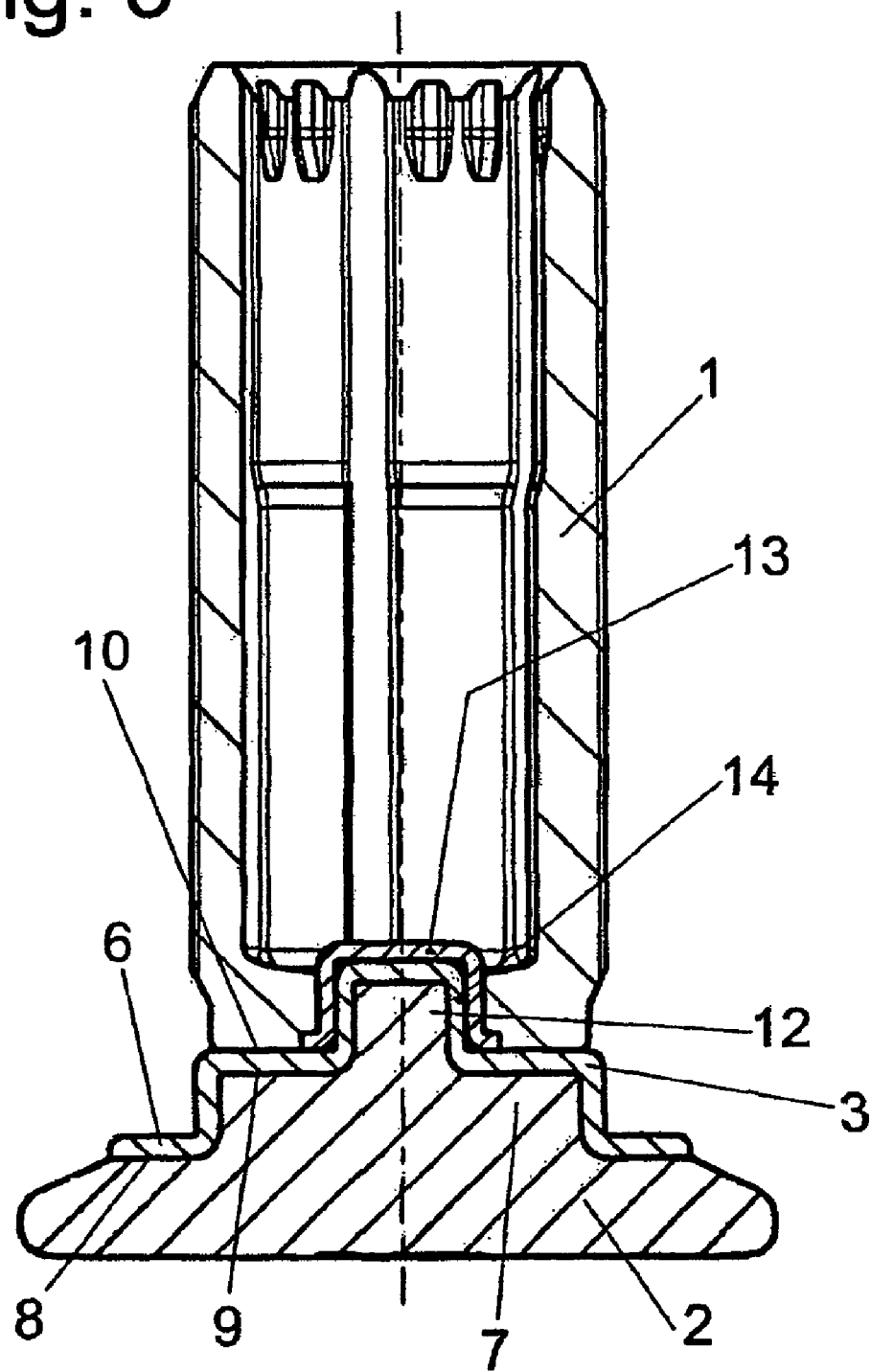

In each of FIGS. 1 to 3 an actuating spindle 1 to which is fastened a thrust piece 2 can be seen, the side of which thrust piece 2 oriented away from the actuating spindle 1 can be pressed by means of the actuating spindle 1 against a brake pad (not shown) in the event of braking.

The thrust piece 2, which consists at least partially of a duroplastic material and to which a filling material in the form of short glass fibers is preferably admixed, carries a cap 3 against which an end face 10 of the actuating spindle 1 bears on one side and an end face 9 of the thrust piece 2 on the other. The cap 3 preferably consists essentially of steel, such as a stainless steel. With its circumferential wall the cap 3 surrounds a cylindrical projection 7 of the thrust piece 2, thus forming a radial support. Additionally formed integrally thereon is an outwardly oriented radial circumferential collar 6, which adjoins the axial wall of the cap 3 and rests against a shoulder 8 of the thrust piece 2.

The pressure forces to be transmitted to the thrust piece 2 by the actuating spindle 1 in the event of operation are thus distributed over a relatively large area, namely over the abutment site formed between the end faces 9, 10 and the collar 6.

In addition, the thrust piece 2 is pressed onto a concentric projection 4 of the actuating spindle 1, for which purpose a blind hole 5 is provided in the thrust piece 2 in order to receive the projection 4.

Whereas, in the example shown in FIG. 1, the projection 4 passes through a central opening of the cap 3, in the example shown in FIG. 2 the central opening is closed, the projection 4 of the actuating spindle 1, which may be configured as a threaded tube, being retained in a cup 11 portion of the cap 3.

The closed surface of the cap 3 prevents moisture from reaching the interior of the caliper, for example in the event of cracking within the thrust piece.

In the example shown in FIG. 3, a guide pin 12 is formed integrally on the thrust piece on the side oriented towards the actuating spindle 1, which guide pin 12 is retained in a hood portion 14 of the cap 3, which in turn is pressed into a pot-shaped receptacle 13 of the actuating spindle 1.

Figure 4:
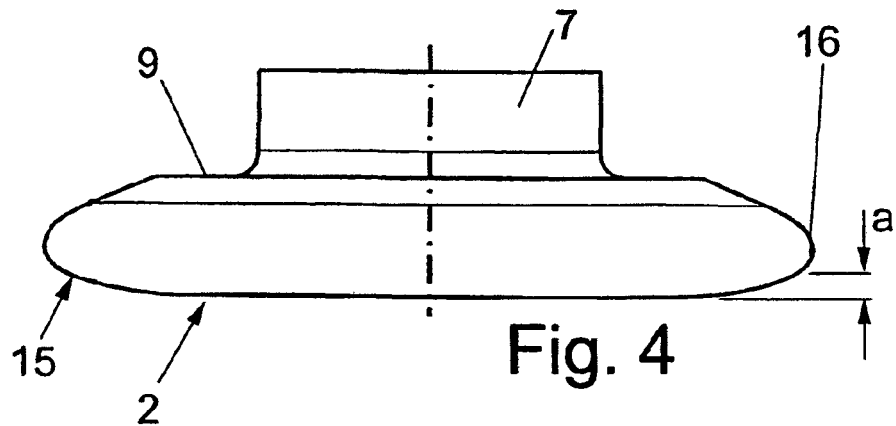
FIGS. 4 to 6 show different exemplary embodiments of a detail according to FIGS. 1 to 3 in a side view in each case.
Figure 5:
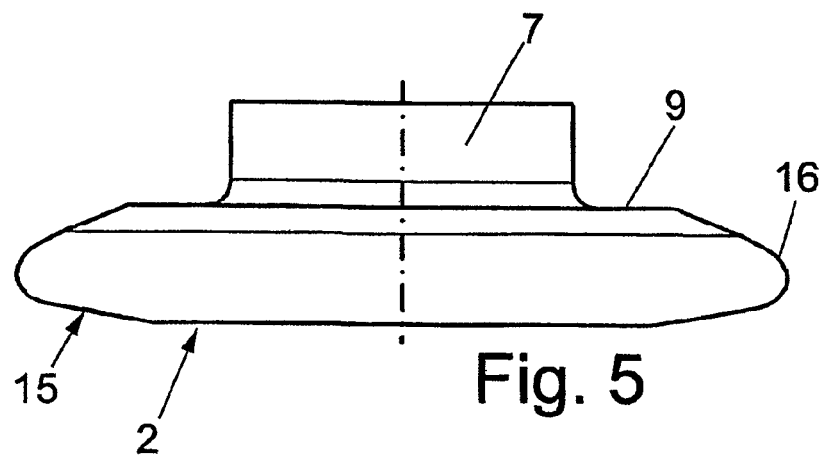
Figure 6:
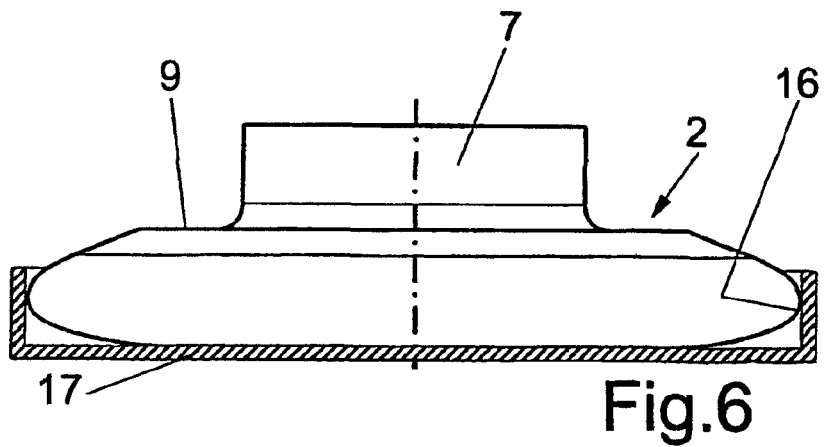
Figure 7:
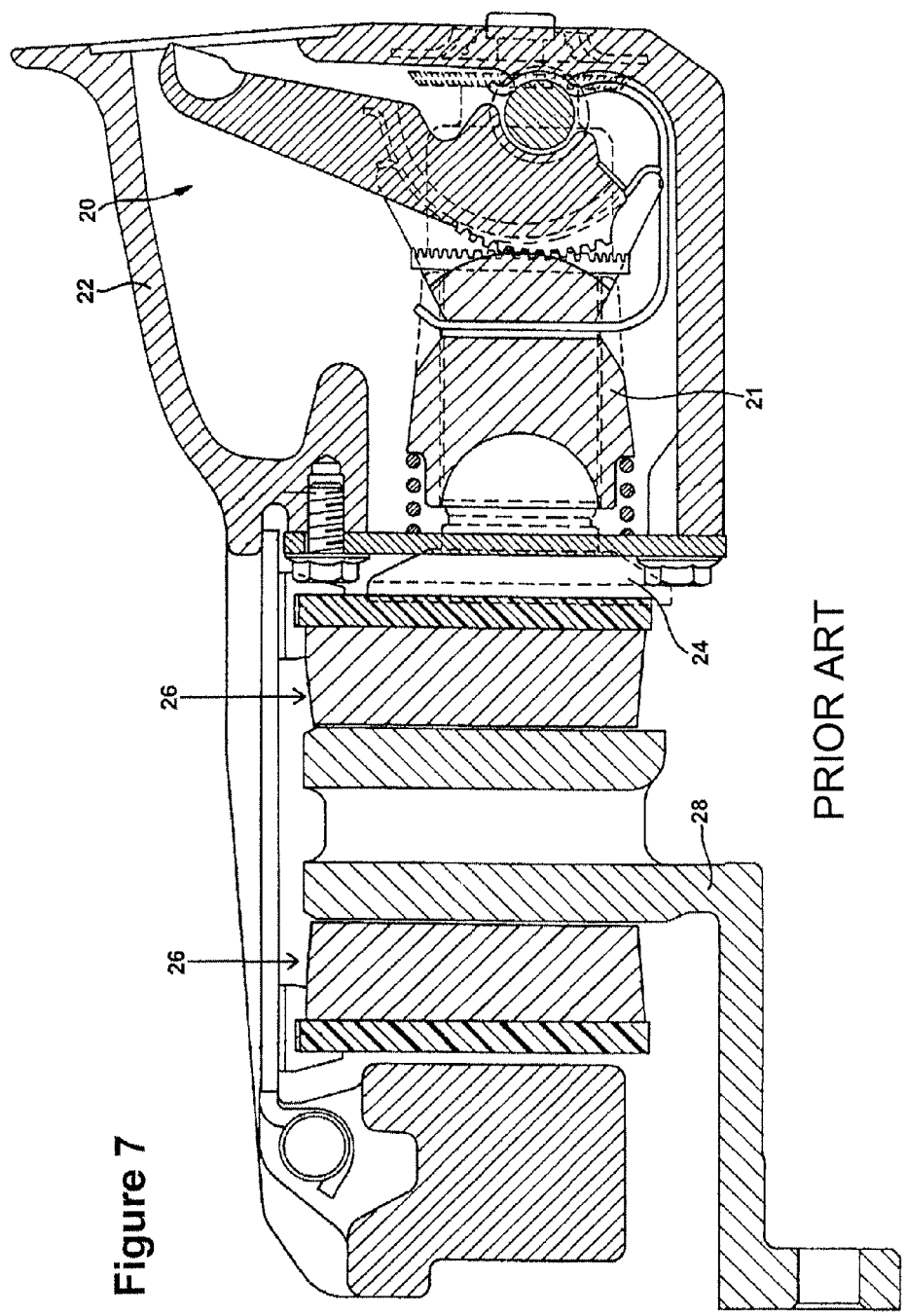
FIG. 7 illustrates the basic structure of a known disc brake as disclosed in DE 195 15 063 C2.

FIGS. 4 and 5 show respective special configurations of the thrust piece 2.

It can be seen in FIG. 4 that a concentric flat central region is adjoined by a convex edge region 15 which merges into a rounded edge 16, the radius of which must be kept as large as possible so that splitting-off of the very brittle duroplastic material is prevented. Depending on the material properties, the increasing gap "a" formed in the direction of the edge 16 may be approximately 0.1 mm.

In FIG. 5 the edge region 15 is in the form of a chamfer, although its effect is otherwise comparable to that of the convex configuration according to FIG. 4.

In order to reduce the friction arising between the brake pad, i.e. a pad carrier plate, and the thrust piece 2, the thrust piece 2 is mounted in a thin-walled cover 17, which surrounds the thrust piece 2 on its contact surface and in the region of the circumferential edge 16, the cover 17 being formed flat in its overlap area with the thrust piece 2 and forming a pressure surface against the lining carrier plate. This cover 17 is preferably made of sheet steel, in particular of a stainless steel.

| Table Reference Numerals | |
|---|---|
| 1 | Actuating spindle |
| 2 | Thrust piece |
| 3 | Cap |
| 4 | Projection |
| 5 | Blind hole |
| 6 | Collar |
| 7 | Projection |

-continued

Table Reference Numerals

| | |
|---|---|
| 8 | Shoulder |
| 9 | End face |
| 10 | End face |
| 11 | Cup |
| 12 | Guide pin |
| 13 | Receptacle |
| 14 | Hood |
| 15 | Edge region |
| 16 | Edge |
| 17 | Cover |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake disc and a caliper that, when installed, straddles the brake disc, the disc brake comprising:
a brake application device arrangeable in the caliper, the brake application device including at least one actuating spindle having an associated thrust piece and being configured to press a brake pad against the brake disc, the thrust piece being formed at least partially of a duroplastic material; and
a cap interposed between end faces oriented toward one another and forming pressure surfaces of the actuating spindle and the thrust piece through which pressure is applied, respectively, a radially outer axially extending wall of the cap surrounding a radially outer axially extending wall of a projection of the thrust piece.

2. The disc brake according to claim 1, wherein the disc brake is a commercial vehicle disc brake.

3. The disc brake according to claim 1, wherein the cap consists essentially of steel.

4. The disc brake according to claim 3, wherein the steel is a stainless steel.

5. The disc brake according to claim 1, wherein the thrust piece contains a fiber filling material.

6. The disc brake according to claim 3, wherein the thrust piece contains a fiber filling material.

7. The disc brake according to claim 5, wherein the fiber filling material consists includes glass fibers.

8. The disc brake according to claim 7, wherein the glass fibers are short glass fibers.

9. The disc brake according to claim 1, wherein the cap has a circumferential collar oriented radially outward from the wall, the collar resting against a shoulder of the thrust piece.

10. The disc brake according to claim 1, wherein the actuating spindle includes a concentric projection on a side oriented toward the thrust piece, said concentric projection being configured to engage in a concentric blind hole of the thrust piece.

11. The disc brake according to claim 1, wherein the cap is one of pressed onto and bonded to the thrust piece.

12. The disc brake according to claim 1, wherein the cap is an insert around which material is injection molded.

13. The disc brake according to claim 10, wherein the cap includes an inserted cup into which the concentric projection is one of threaded or pressed.

14. The disc brake according to claim 1, wherein the thrust piece includes a guide pin projecting in a direction of the actuating spindle, the guide pin being located in a hood of the cap.

15. The disc brake according to claim 14, wherein the guide pin is retained with the hood in a pot-shaped receptacle of the actuating spindle.

16. The disc brake according to claim 1, wherein the thrust piece has a flat concentric contact surface adjoined by a circumferential rising edge region on a side oriented away from the actuating spindle.

17. The disc brake according to claim 16, wherein the edge region has a convex configuration.

18. The disc brake according to claim 16, wherein the edge region is formed of a chamfer.

19. The disc brake according to claim 16, wherein the edge region merges into a rounded lateral edge of the thrust piece.

20. The disc brake according to claim 1, further comprising a cover arranged over a side of the thrust piece oriented away from the actuating spindle.

21. The disc brake according to claim 16, further comprising a cover arranged over a side of the thrust piece oriented away from the actuating spindle.

22. The disc brake according to claim 21, wherein the cover is operatively configured to cover the contact surface, the edge region, and at least a portion of a lateral edge of the thrust piece.

23. The disc brake according to claim 20, wherein the cover has a flat contact surface covering an underside of the thrust piece.

24. The disc brake according to claim 20, wherein the cover is formed of steel.

25. The disc brake according to claim 1, wherein an axial thickness of the thrust piece exceeds an axial thickness of the cap at least in an area between the end faces.

* * * * *